United States Patent
Ionita et al.

(10) Patent No.: US 10,764,204 B2
(45) Date of Patent: Sep. 1, 2020

(54) CLOUD EXTENSIBILITY FRAMEWORK

(71) Applicant: SAP SE, Walldorf (DE)

(72) Inventors: Alexandru Ionita, Montreal (CA); Igor Rohal, Munich (DE); Jonathan Cloutier, Montreal (CA); Kasim Rehman, Munich (DE); Michael Stephan, Vienna (AT); Oleg Koutyrine, Dielheim (DE); Rami Samir El Achkar, Laval (CA); Stefan Kiene, Sachsenheim (DE); Venkat Reddy Kunnam, Montreal (CA); Wolfgang Sattler, Kirkel (DE)

(73) Assignee: SAP SE, Walldorf (DE)

( * ) Notice: Subject to any disclaimer, the term of this patent is extended or adjusted under 35 U.S.C. 154(b) by 364 days.

(21) Appl. No.: 15/630,266

(22) Filed: Jun. 22, 2017

(65) Prior Publication Data

US 2018/0375788 A1 Dec. 27, 2018

(51) Int. Cl.
| | | |
|---|---|---|
| *G06F 15/16* | (2006.01) | |
| *H04L 12/911* | (2013.01) | |
| *G06F 9/50* | (2006.01) | |
| *G06F 9/455* | (2018.01) | |

(52) U.S. Cl.
CPC ............ *H04L 47/78* (2013.01); *G06F 9/5005* (2013.01); *G06F 9/45558* (2013.01); *G06F 9/5061* (2013.01); *G06F 9/5072* (2013.01)

(58) Field of Classification Search
CPC .. G06F 9/45558; G06F 9/5005; G06F 9/5061; G06F 9/5072; H04L 47/78
See application file for complete search history.

(56) References Cited

U.S. PATENT DOCUMENTS

| | | | | |
|---|---|---|---|---|
| 7,130,863 B2* | 10/2006 | Diab | ................... | G06F 8/24 |
| 7,904,570 B1* | 3/2011 | Kroupa | ................... | G06F 16/10 |
| | | | | 709/229 |
| 8,805,971 B1* | 8/2014 | Roth | ................... | G06F 9/5072 |
| | | | | 709/203 |
| 8,856,077 B1* | 10/2014 | Roth | ................... | H04L 67/1095 |
| | | | | 707/638 |
| 9,124,633 B1* | 9/2015 | Eizadi | ................. | G06F 16/2379 |
| 9,430,295 B1* | 8/2016 | Eizadi | ................. | G06F 9/45558 |
| 9,535,663 B2* | 1/2017 | Yaseen | | |
| 2011/0307523 A1* | 12/2011 | Balani | ................ | H04L 47/70 |
| | | | | 707/802 |
| 2012/0185821 A1* | 7/2012 | Yaseen | ...................... | G06F 8/35 |
| | | | | 717/105 |
| 2013/0055201 A1* | 2/2013 | No | ......................... | G06F 3/048 |
| | | | | 717/113 |

(Continued)

*Primary Examiner* — Moustafa M Meky
*Assistant Examiner* — Thorne E Waugh
(74) *Attorney, Agent, or Firm* — Sterne, Kessler, Goldstein & Fox P.L.L.C.

(57) ABSTRACT

Disclosed herein are system, method, and computer program product embodiments for extending data models and processes in a cloud platform. An embodiment operates by selecting an entity metadata in the cloud platform. The embodiment defines an extension metadata for the entity metadata. The embodiment defines an extended entity metadata based on the entity metadata and the extension metadata. The embodiment then creates an extended entity instance in the cloud platform based on the extended entity metadata.

20 Claims, 4 Drawing Sheets

(56) References Cited

U.S. PATENT DOCUMENTS

2014/0181306 A1\* 6/2014 Kothamasu ......... H04L 41/5077
                                                        709/226
2018/0052861 A1\* 2/2018 Seetharaman ........ G06F 3/0428
2018/0052898 A1\* 2/2018 Allan .................... G06F 3/0649

\* cited by examiner

CLOUD EXTENSIBILITY FRAMEWORK

BACKGROUND

Software applications are increasingly being built, deployed, and managed in the cloud. This is because the cloud enables ubiquitous, on-demand access to a shared pool of configurable computing resources (e.g., computer networks, servers, and storage), which can be rapidly provisioned and released with minimal management effort.

A developer may build a cloud-based application from base data models and processes. After completion and deployment of a cloud-based application, subscribers to the cloud-based application may want to extend these base data models and processes to meet their specific needs. For example, they may want to extend a product data model to include additional attributes such as product dimensions. But the developer may be unable to extend these base data models and processes without directly modifying them in the cloud platform.

Software application providers who provide their software applications on a cloud platform, however, do not allow a developer to modify these base data models and processes. This is because these base data models and processes are publicly shared by all the customers of these software applications. This means that changes to the base data models and processes are immediately made available to the consumers of these software applications in the cloud platform. Thus, there is no way to extend the base data models and processes in the cloud platform without directly modifying them. Moreover, there is no way to store data models and processes in the cloud platform at different service providers.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for extending data models and processes in a cloud platform. An embodiment operates by defining an extension metadata for an entity metadata representing a base data model in a cloud platform. The embodiment then defines an extended entity metadata based on the entity metadata and the extension metadata. The embodiment then creates an extended entity in the cloud platform based on the extended entity metadata. The extended entity extends the base data model of the entity metadata with the data model and processes of the extension metadata. The combination of the entity metadata with the extension metadata enables the entity metadata to be extended with additional data models and processes without modification.

Traditionally, software application providers who provide their software applications on a cloud platform do not allow modification of their base data models and processes. This is because these base data models and processes are publicly shared by all software applications. This means that a change to the base data models and processes is immediately made available to all customers of the software applications. But some software applications may require different data models and processes.

Embodiments herein provide an innovative extension mechanism that enables base data models and processes to be extended with additional data models and processes without modification. Embodiments herein provide several benefits. First, because the base data models and processes are not modified, existing software applications can continue to rely on the base data models and processes for their operation. Second, embodiments herein enable the additional data models and processes to be stored at a different location from the base data models and processes including with different service providers. This allows software applications to save their extended data in a customer's own databases instead of in the cloud platform provider's database. Software applications can therefore manage the storage of their data for their own privacy and security reasons. Finally, embodiments herein provide a way to automatically link the base data models and processes with the extension data models and processes. This allows software applications to create, update, and delete extended data models and processes in a single step, and without requiring multiple calls to computer programs running on the cloud platform. This reduces network overhead and enables faster creation and updating of the data models and processes.

Figure 1:
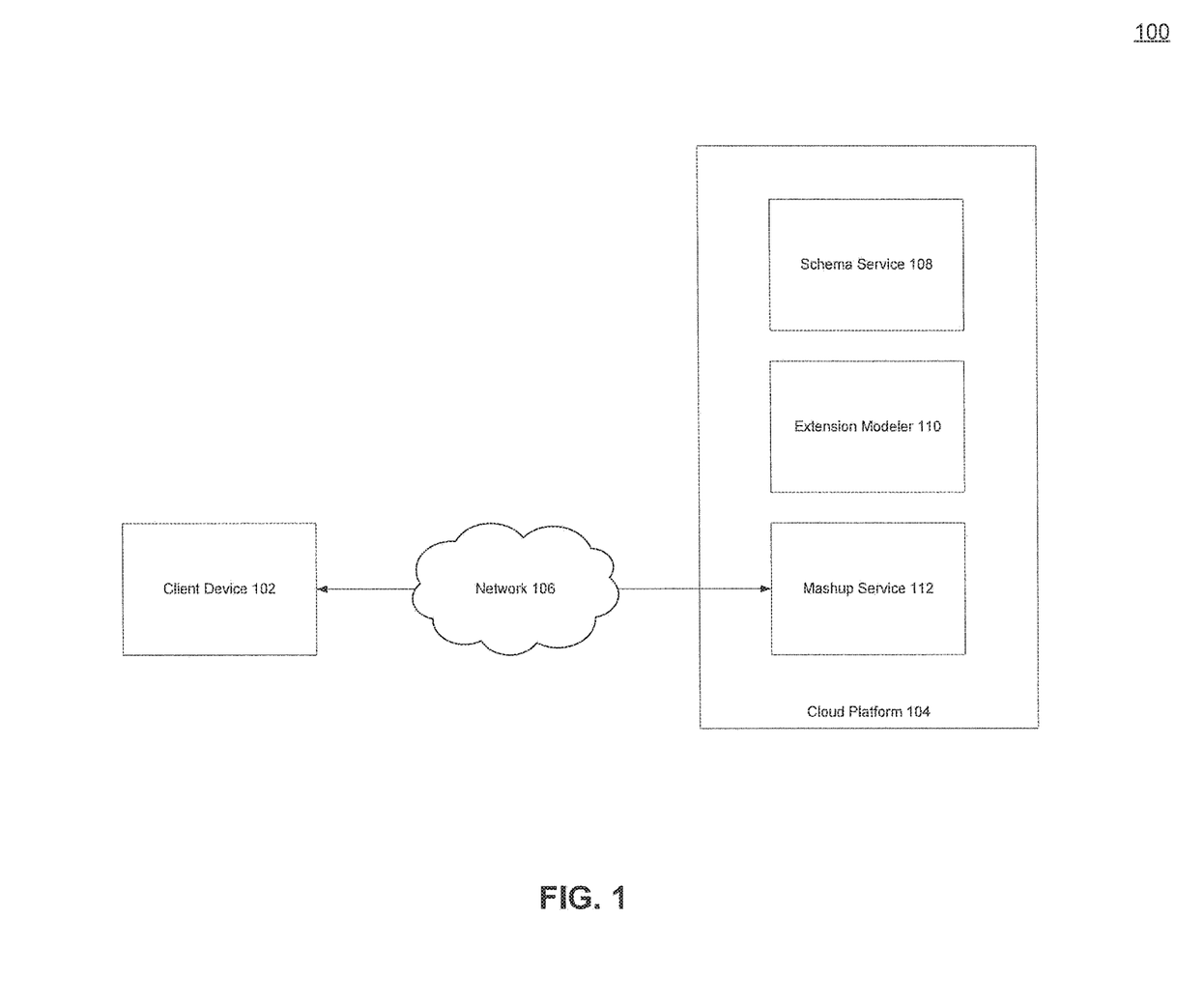
FIG. 1 is a block diagram of a cloud extensibility system, according to some embodiments.

FIG. 1 is a block diagram 100 of a cloud extensibility system 100, according to some embodiments. Cloud extensibility system 100 enables a developer to extend base data models and processes with additional data models and processes. Cloud extensibility system 100 includes one or more client devices 102 connected to cloud platform 104 via network 106. Client device 102 may be a desktop computer, laptop, tablet, smartphone, or other device as would be appreciated by a person of ordinary skill in the art. Cloud platform 104 may be a software platform for cloud computing. For example, cloud platform 104 may be Software as a Service (SaaS) cloud platform where a business subscribes to an application that it accesses via the Internet. Network 106 may be any network or combination of networks including the Internet, a local area network (LAN), a wide area network (WAN), a wireless network, a cellular network, or various other types of networks as would be appreciated by a person of ordinary skill in the art.

Cloud platform 104 includes a schema service 108, an extension modeler 110 and a mashup service 112. Extension modeler 110 may define data models and processes that extend base data models. For example, extension modeler 110 may use an extension mechanism to add data models and processes to base data models and processes without modification. This involves using entities, extensions, and extended entities from cloud platform 104.

In some embodiments, an entity is an instance of a concept such as a product, customer, or order. An entity may be created according to an entity metadata. An entity metadata may define a data model for an entity. For example, an entity metadata may include a schema. The schema may define how data is organized in the entity. For example, the schema may define the number, names, and types of attributes for the entity. An entity metadata may include a link to a schema stored in schema service 108. For example, an entity metadata may include a schema uniform resource locator (URL) or link that points to the location of the schema in schema service 108. As would be appreciated by a person of ordinary skill in the art, a schema may define data in an entity in various ways such as using a database table in a relational database.

In some embodiments, an entity's metadata may include a unique identifier that identifies the entity metadata within cloud platform 104. Extension modeler 110 may assign the unique identifier to the entity metadata upon creation.

In some embodiments, an entity metadata may define an entity service that is responsible for storing and performing operations on the associated entity's data. For example, an entity metadata may include a Create Update Delete (CRUD) URL that points to the entity service. The entity service may be located and controlled by a different service provider then the provider of cloud platform 104.

In some embodiments, an entity metadata may define an extension interface. An extension interface may define a list of functions that an associated entity can have as its extended behavior. An extension linked to the entity may implement one or more of the functions.

In some embodiments, an extension is an instance of an extension metadata. An extension metadata may define an extended data model and associated functions for an entity. For example, an extension metadata may include a schema URL or link to a schema. The schema may define the number, names, and types of extended attributes for an entity. As would be appreciated by a person of ordinary skill in the art, a schema may define data in an extension in various ways such as using a database table in a relational database.

In some embodiments, an extension metadata may include a unique identifier that identifies the extension metadata within cloud platform 104. Extension modeler 110 may assign the unique identifier to the extension metadata upon creation.

In some embodiments, an extension metadata may define a list of functions. For example, an extension metadata may define an extension function link that includes a list of function names and their locations of implementation. A function's location of implementation may be defined using a URL.

In some embodiments, an extension metadata may define an extension service that is responsible for storing and performing operations on extension data. For example, an extension metadata may include a CRUD URL that points to an extension service. The extension service may be located and controlled by a different service provider than the provider of cloud platform 104.

In some embodiments, an extended entity is an instance of an extended entity metadata. An extended entity metadata logically groups an entity metadata and one or more extension metadata. An extended entity logically represents an entity and its extended data and functions. The extended data and functions may be made up of one or more extension instances. Thus, the underlying entity does not need to be modified to include the extended data and functions because the extended data and functions are included in the one or more extensions linked to the entity via the extended entity.

In some embodiments, extension modeler 110 defines entity metadata, extension metadata, and extended entity metadata. For example, extension modeler 110 may create an extended entity metadata in response to a request from client device 102. The extended entity metadata may extend an entity metadata representing a base data model with additional data and functions.

In some embodiments, extension modeler 110 may create an extended entity metadata by first receiving a request to create a new entity metadata. Extension modeler 110 may define a data model for new entity metadata by linking the new entity metadata to an entity metadata representing a base data model. For example, extension modeler 110 may set a schema attribute in the new entity metadata to the schema of the entity metadata being extended.

In some embodiments, extension modeler 110 may then receive a request from client device 102 to create a new extension metadata. Extension modeler 110 may then create the extended entity metadata by linking the new extension metadata to the new entity metadata.

In some embodiments, extension modeler 110 may receive a request from client device 102 to add one or more functions to the extension metadata. The one or more functions may correspond to one or more function names specified in an extension interface in the new entity metadata. Extension modeler 110 may link the one or more functions to the extension metadata. For example, extension modeler 110 may assign the one or more functions to an extension function attribute of the extension metadata. The extension function attribute may be map data structure that maps a function name to an extension service endpoint which stores and executes the particular function. The extension service may be located and controlled by a different service provider than the provider of cloud platform 104.

In some embodiments, extension modeler 110 may receive a request from client device 102 to create, update, and delete an entity metadata, an extension metadata, or an extended entity metadata using JavaScript Notation (JSON). As would be appreciated by a person of ordinary skill in the art, extension modeler 110 may receive a request from client device 102 using various other data formats such as eXtensible Markup Language (XML).

In some embodiments, extension modeler 110 may store the defined entity metadata, extension metadata, and extended entity metadata for creation, update, and deletion of entities, extensions, and extended entities by mashup service 112.

In some embodiments, mashup service 112 performs CRUD operations on data models. For example, mashup service 112 creates, updates, and deletes instances of entities, extensions, and extended entities.

In some embodiments, mashup service 112 may receive a request from client device 102 to create, update, and delete an entity, an extension, or an extended entity using JSON. As would be appreciated by a person of ordinary skill in the art, mashup service 112 may receive a request from client device 102 using various other data formats such as eXtensible Markup Language (XML).

In some embodiments, mashup service 112 may receive a request from client device 102 to create a new extended entity instance based on an extended entity metadata in extension modeler 110. In response, mashup service 112 may create the corresponding entity and one or more extensions for the extended entity instance.

In some embodiments, mashup service 112 may create a mashup data structure for the extended entity instance. The mashup data structure may include models representing the corresponding entity instance, and an extended entity instance holding the corresponding one or more extensions.

In some embodiments, the entity instance in the mashup data structure may include a link to its corresponding entity metadata in extension modeler 110 and an entity data object.

In some embodiments, the entity data object may include a unique identifier that identifies the entity instance within cloud platform 104. Mashup service 112 may assign the unique identifier to the entity instance upon creation.

In some embodiments, the entity data object may store attribute data of the entity instance. In some embodiments, mashup service 112 may retrieve the attribute data from the associated entity service defined in the corresponding entity metadata. For example, mashup service 112 may retrieve the attribute data from the entity service defined by the CRUD URL in the corresponding entity metadata.

In some embodiments, the entity data object may store the attribute data of the entity instance in a map data structure. For example, the map data structure may store (key, value) pairs where the key corresponds to an attribute name and the value corresponds to the attribute value. In some embodiments, the map data structure may be a JSON map data structure. As would be appreciated by a person of ordinary skill in the art, the entity data object may store the attribute data in various other data structures such as an array.

In some embodiments, the extended entity instance in the mashup data structure may include a unique identifier that identifies the extended entity instance within cloud platform 104. Mashup service 112 may assign the unique identifier to the extended entity instance upon creation.

In some embodiments, the extended entity instance may include a link to the corresponding extended entity metadata created by extension modeler 110. The extended entity instance may further include one or more extension instances associated with the extended entity instance. An extension instance of the one or more extension instances may be based on an extension metadata defined by extension modeler 110.

In some embodiments, an extension instance of the one or more extension instances may include a unique identifier that identifies the extension within cloud platform 104. Mashup service 112 may assign the unique identifier to the extension instance upon creation.

In some embodiments, the extension instance may further include a link to the corresponding extended entity metadata. The extension instance may further include an extension data object that stores the attribute data of the extension instance retrieved from the corresponding extension service. In some embodiments, mashup service 112 may retrieve the attribute data from the extension service defined in the corresponding extension metadata. For example, mashup service 112 may retrieve the attribute data from the extension service defined by the CRUD URL in the corresponding extension metadata.

In some embodiments, the extension data object may store the attribute data of the extension instance in a map structure. For example, the map data structure may store (key, value) pairs where the key corresponds to an attribute name and the value corresponds to the attribute value. In some embodiments, the map data structure may be a JSON map data structure. As would be appreciated by a person of ordinary skill in the art, the data object may store the attribute data in various other data structures such as an array In some embodiments, mashup service 112 may create instances of entities, extensions, and extended entities in response to a request from client device 102. Mashup service 112 may store attribute data for an entity instance at its corresponding entity service. Mashup service 112 may further store attribute data for an extension instance at its corresponding extension service. Mashup service 112 may create a unique identifier for every instance upon creation. Mashup service 112 may track the instances based on their unique identifiers.

In some embodiments, mashup service 112 may store references to entity and extended entity instances in an instance reference model. For example, for each instance, the instance references model may include the instance's unique instance identifier, the unique identifier of its corresponding entity metadata, and the unique identifier of its corresponding entity instance. The instance references model may further include the unique identifier of the corresponding extended entity metadata and a list of extension references.

In some embodiments, mashup service 112 may store the extension references in an extension reference model. For example, for each extension instance, the extension reference model may include the instance's unique instance identifier, the unique identifier of its corresponding extension metadata, and a URL pointing to the location of the saved extension instance.

In some embodiments, mashup service 112 may track information about failed requests to create, update, and delete entities, extensions, and extended entities. Mashup service 112 may use an inconsistencies model to store failed requests.

For example, mashup service 112 may store a failed request in the inconsistencies model when creating an extended entity instance and one of the requests to create an associated entity or extension fails. This is because mashup service 112 may try to rollback a successfully created entity or extension to maintain data consistency. However, there is a chance the rollback could fail too. Therefore, mashup service 112 may add the failed rollback request to the inconsistencies model so that an administrator can deal with it to maintain consistency.

Mashup service 112 may also store a failed request in the inconsistencies model when deleting an extended entity instance. This is because mashup service 112 may try to first delete the entity, and then try to delete the extension instances asynchronously. But mashup service 112 may fail to delete one or more of the extension instances. Therefore, mashup service 112 may add the failed requests to delete the extension instances to the inconsistency model so that an administrator can deal with them to maintain consistency.

In some embodiments, mashup service 112 may store failed requests in the inconsistencies data model. For example, for each failed request, the inconsistencies data model may include a unique identifier for the failed request, an identifier identifying the corresponding client device, the failed operation, the unique identifier of the corresponding entity metadata or extension metadata, a URL pointing to the location of the instance, and the unique identifier of the instance in the instance reference table.

Figure 2:
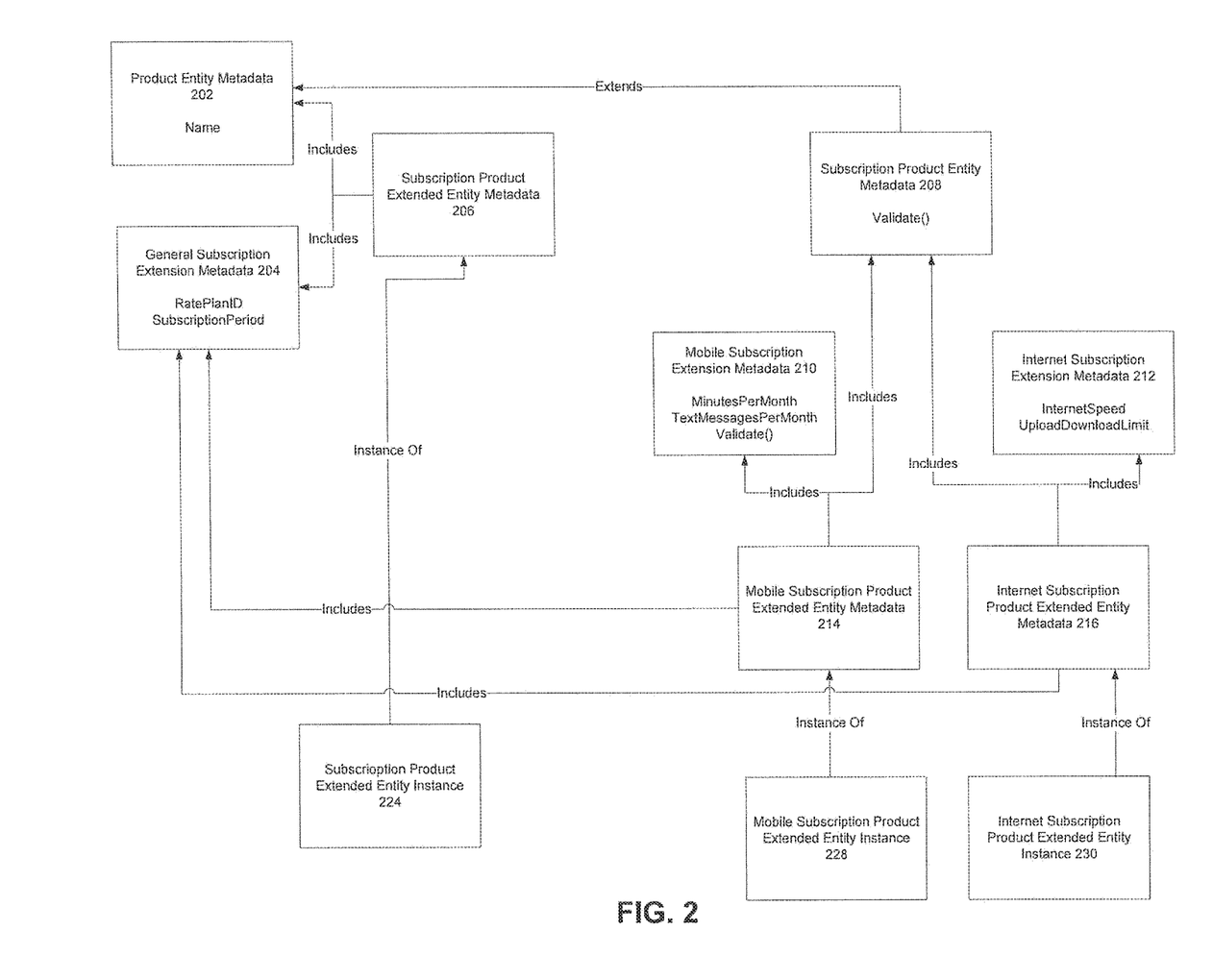
FIG. 2 is an example of how an extension modeler may extend a data model and process in a cloud platform, according to some embodiments.

FIG. 2 illustrates an example of how extension modeler 110 may extend a data model and process in cloud platform 104, according to some embodiments. FIG. 2 shall be described with reference to FIG. 1. In FIG. 2, a developer wants to model a subscription product using extension modeler 110. The developer observes that an entity metadata called Product Entity Metadata 202 is already provided by cloud platform 104. Product Entity Metadata 202 defines a Name attribute according to an associated schema. The developer further observes that an extension metadata called General Subscription Extension Metadata 204 is already provided by cloud platform 104. General Subscription Extension Metadata 204 defines RatePlanID and SubscriptionPeriod attributes according to an associated schema. Finally, the developer observes that an extended entity metadata called Subscription Product Extended Entity Metadata 206 is already provided by cloud platform 104. Subscription Product Extended Entity Metadata 206 logically groups together the Product Entity Metadata 202 and General Subscription Extension Metadata 204. Subscription Product Extended Entity Metadata 206 therefore defines Name, RatePlanID, and SubscriptionPeriod attributes.

In FIG. 2, the developer decides to extend the Product Entity Metadata 202. The developer creates a new entity metadata called Subscription Product Entity Metadata 208 using extension modeler 110. The developer sets the schema of the Subscription Product Entity Metadata 208 to the schema of the Product Entity Metadata 202. The developer further sets the CRUD URL of the Subscription Product Entity Metadata 208 to the CRUD URL of the Product Entity Metadata 202.

The developer then creates an extension metadata called Mobile Subscription Extension Metadata 210. The developer models the Mobile Subscription Extension Metadata 210's attributes by creating a schema with the following attributes: MinutesPerMonth and TextMessagesPerMonth. These attributes represent new extended data. The developer then posts the schema to schema service 108. The developer sets the schema URL of Mobile Subscription Extension Metadata 210 to the location of the schema in schema service 108.

The developer then creates another extension metadata called Internet Subscription Extension Metadata 212. The developer models the Internet Subscription Extension Metadata 212's attributes by creating a schema with the following attributes: InternetSpeed and UploadDownload Limit. These attributes represent new extended data. The developer then posts the schema to schema service 108. The developer sets the schema URL of Internet Subscription Extension Metadata 212 to the location of the schema in schema service 108.

The developer then creates two extended entity metadata called Mobile Subscription Product Extended Entity Metadata 214 and Internet Subscription Product Extended Entity Metadata 216. The developer uses extension modeler 110 to link Product Entity Metadata 202 to Mobile Subscription Product Extended Entity Metadata 214. The developer further uses extension modeler 110 to assign the General Subscription Extension Metadata 204 and Mobile Subscription Extension Metadata 210 to Mobile Subscription Product Extended Entity Metadata 214. The Mobile Subscription Product Extended Entity Metadata 214 therefore has Name, RatePlanID, SubscriptionPeriod, MinutesPerMonth, and TextMessagesPerMonth attributes.

Similarly, the developer uses extension modeler 110 to link Product Entity Metadata 202 to Internet Subscription Product Extended Entity Metadata 216. The developer further uses extension modeler 110 to assign the General Subscription Extension Metadata 204 and Internet Subscription Extension Metadata 212 to Internet Subscription Product Extended Entity Metadata 216. The Internet Subscription Product Extended Entity Metadata 216 therefore has Name, RatePlanID, SubscriptionPeriod, InternetSpeed, and UploadDownloadLimit attributes.

The developer uses extension modeler 110 to further enhance the behavior of the Mobile Subscription Extension Metadata 210. The developer may define an extension interface function called Validate for the Subscription Product Entity Metadata 208. The developer may define a unique implementation for the Validate function at an extension service provider. The developer then adds the function name (e.g. Validate) and its extension service endpoint to the Mobile Subscription Extension Metadata 210.

After adding the Validate function to the Mobile Subscription Extension Metadata 210, the mashup service 112 will direct all calls to the Validate function to the corresponding extension service endpoint specified in the Mobile Subscription Extension Metadata 210.

The developer may use mashup service 112 to create instances of the Product Entity Metadata 202, Subscription Product Entity Metadata 208, Subscription Product Extended Entity Metadata 206, Mobile Subscription Product Extended Entity Metadata 214, and Internet Subscription Product Extended Entity Metadata 216. For example, in FIG. 2, Subscription Product Extended Entity Instance 224 is an instance of Subscription Product Extended Entity Metadata 206. Subscription Product Extended Entity Instance 224 also is associated with an entity of Product Entity Metadata 202 and an instance of General Subscription Extension Metadata 204.

In FIG. 2, Mobile Subscription Product Extended Entity Instance 228 is an instance of Mobile Subscription Product Extended Entity Metadata 214. Mobile Subscription Product Extended Entity Instance 228 also is associated with an instance of Subscription Product Entity Metadata 208 and instances of General Subscription Extension Metadata 204 and of Mobile Subscription Extension Metadata 210.

In FIG. 2, Internet Subscription Product Extended Entity Instance 230 is an extended entity instance of Internet Subscription Product Extended Entity Metadata 216. Internet Subscription Product Extended Entity Instance 230 also is associated with an entity instance of Subscription Product Entity Metadata 208 and extension instances of General Subscription Extension Metadata 204 and Internet Subscription Extension Metadata 212.

Figure 3:
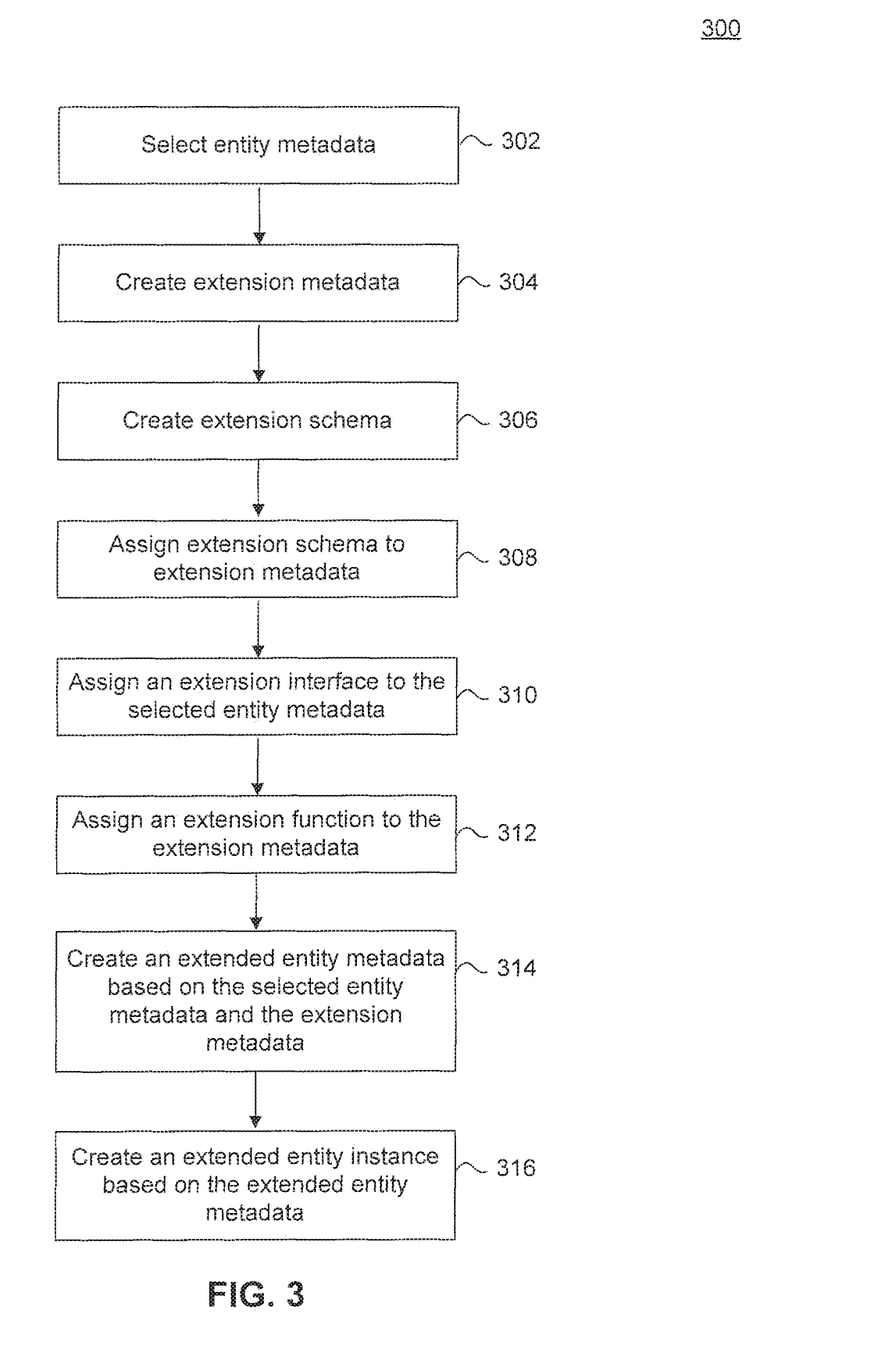
FIG. 3 is a flowchart illustrating a process for extending a data model and process in a cloud platform, according to some embodiments.

FIG. 3 is a flowchart for a method 300 for extending a data model and process in cloud platform 104, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

Method 300 shall be described with reference to FIG. 1. However, method 300 is not limited to that example embodiment.

In 302, extension modeler 110 selects an entity metadata to extend in response to a request from client device 102. In some embodiments, extension modeler 110 first creates the entity metadata in response to a request from client device 102. Extension modeler 110 then sets the schema URL (or schema link) for the entity metadata. The schema URL stores a reference the schema for the entity metadata. The schema may be for a base entity metadata. In some embodiments, extension modeler 110 assigns an entity service to the CRUD URL of the entity metadata.

In 304, extension modeler 110 creates a new extension metadata in response to a request from client device 102.

In 306, schema service 108 creates a schema for the new extension metadata in response to a request from client device 102.

In 308, extension modeler 110 assigns the schema in schema service 108 to the new extension metadata in response to a request from client device 102. In some embodiments, extension modeler 110 sets the schema URL (or schema link) in the new extension metadata to the location of the schema in the schema service 108.

In 310, extension modeler 110 assigns an extension interface to the new entity metadata in response to a request from client device 102. In some embodiments, extension modeler 110 first creates the extension interface in response to a request from client device 102.

The extension interface defines a list of functions that may be implemented in extensions to the selected entity metadata. In some embodiments, extension modeler 110 assigns a (function name, flag) pair to the selected entity metadata where the function name identifies the particular function and the flag indicates whether the function has a unique implementation.

In 312, extension modeler 110 assigns an extension function to the new extension metadata in response to a request from client device 102. The extension function is a function defined in the extension interface for the selected entity metadata. In some embodiments, extension modeler 110 assigns a (function name, URL) pair to an extension link in the extension metadata where the function name identifies the particular function and the URL identifies the location to execute the function's implementation.

In 314, extension modeler 110 creates an extended entity metadata based on the entity metadata and the extension metadata in response to a request from client device 102. In some embodiments, extension modeler 110 assigns a first link from the extended entity metadata to the entity metadata and a second link from the extended entity metadata to the extension metadata. In some embodiments, the first link and second link may be unique identifiers associated with the entity metadata and extension metadata respectively.

In 316, mashup service 112 creates an extended entity instance based on the extended entity metadata in response to a request from client device 102. In some embodiments, mashup service 112 automatically creates the corresponding entity and extension instances and links them together. For example, mashup service 112 may create and store the attribute data of the entity instance at the corresponding entity service, and the extended attribute data of the extension instance at the corresponding extension service. The mashup service 112 may further create and store the entity instance together with the extension instance in a mashup data structure.

Figure 4:
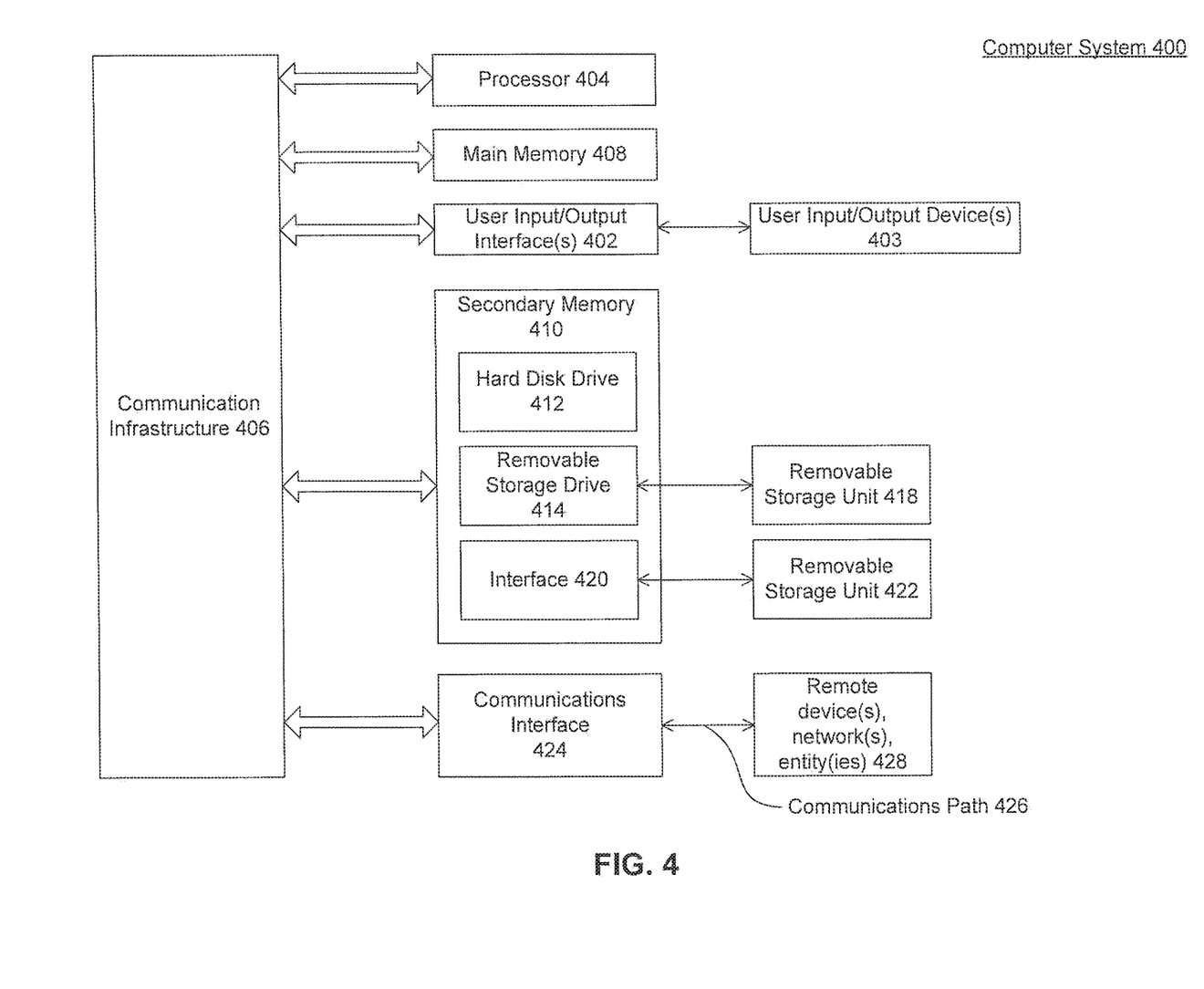
FIG. 4 is an example computer system useful for implementing various embodiments.

Various embodiments can be implemented, for example, using one or more computer systems, such as computer system 400 shown in FIG. 4. Computer system 400 can be used, for example, to implement method 400 of FIG. 4. For example, computer system 400 can create an extended entity metadata based on an entity metadata and an extension metadata. Computer system 400 can further create an extended entity instance based on an extended entity metadata, according to some embodiments. Computer system 400 can be any computer capable of performing the functions described herein.

Computer system 400 (or any portions thereof) may represent a server computer in a distributed computing system. For example, computer system 400 may be a server computer in a cloud computing platform infrastructure such as cloud platform 104 discussed in FIGS. 1-3. Computer system 400 may implement one or more of the elements of cloud platform 104. For example, computer system 400 may implement mashup service 112, schema service 108, extension modeler 110, an entity service, and/or an extension service as discussed in FIGS. 1-3. The various functions of cloud platform 104 may be performed by one or more of computer system 400.

Computer system 400 includes one or more processors (also called central processing units, or CPUs), such as a processor 404. Processor 404 is connected to a communication infrastructure or bus 406.

One or more processors 404 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 also includes user input/output device(s) 403, such as monitors, keyboards, pointing devices, etc., that communicate with communication infrastructure 406 through user input/output interface(s) 402.

Computer system 400 also includes a main or primary memory 408, such as random access memory (RAM). Main memory 408 may include one or more levels of cache. Main memory 408 has stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 includes a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 reads from and/or writes to removable storage unit 418 in a well-known manner.

According to an exemplary embodiment, secondary memory 410 may include other means, instrumentalities or other approaches for allowing computer programs and/or other instructions and/or data to be accessed by computer system 400. Such means, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 enables computer system 400 to communicate and interact with any combination of remote devices (e.g., client device 102), remote networks, remote entities, etc. (individually and collectively referenced by reference number 428). For example, communication interface 424 may allow computer system 400 to communicate with remote devices 428 over communications path 426, which may be wired and/or wireless, and which may include any combination of LANs, WANs, the Internet, etc. Control logic and/or data may be transmitted to and from computer system 400 via communication path 426.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method for extending an entity metadata in a cloud platform, comprising:
   selecting, by at least one processor, the entity metadata in the cloud platform;
   defining, by the at least one processor, an extension metadata for the entity metadata, wherein the extension metadata comprises a schema link and an extension function link;
   defining, by the at least one processor, an extension function at an extension service;
   setting, by the at least one processor, the extension function link to a location of the extension function at the extension service;
   defining, by the at least one processor, an extended entity metadata based on the entity metadata and the extension metadata, wherein the extended entity metadata comprises a first link to the entity metadata in the cloud platform and a second link to the extension metadata in the cloud platform; and
   creating, by the at least one processor, an extended entity instance in the cloud platform from the extended entity metadata.

2. The method of claim 1, further comprising:
   defining, by the at least one processor, a schema in the cloud platform; and
   setting, by the at least one processor, the schema link to a location of the schema in the cloud platform.

3. The method of claim 1, wherein the extended entity instance comprises an entity instance based on the entity metadata, and wherein data of the entity instance is stored in an entity service.

4. The method of claim 3, wherein the entity service is located at a second cloud platform.

5. The method of claim 1, wherein the extended entity instance comprises an extension instance based on the extension metadata, and wherein data of the extension instance is stored in an extension service.

6. The method of claim 1, wherein the creating the extended entity instance in the cloud platform further comprises:
   receiving, by the at least one processor, a request defining the extended entity instance using at least one of JavaScript Object Notation (JSON) or eXtensible Markup Language (XML); and
   creating, by the at least one processor, the extended entity instance based on the request.

7. The method of claim 1, further comprising:
   detecting, by the at least one processor, a request associated with creating the extended entity instance failed; and
   storing, by the at least one processor, the request in an inconsistency model.

8. The method of claim 1, wherein creating the extended entity instance further comprises:
   creating, by the at least one processor, an entity instance based on the entity metadata;
   creating, by the at least one processor, an extension instance based on the extension metadata; and
   linking, by the at least one processor, the entity instance with the extension instance.

9. The method of claim 1, wherein the linking the entity instance with the extension instance further comprises:

storing, by the at least one processor, the entity instance and the extension instance in a mashup data structure.

10. A cloud platform, comprising:
a memory; and
at least one processor coupled to the memory and configured to:
   select an entity metadata;
   define an extension metadata for the entity metadata, wherein the extension metadata comprises a schema link and an extension function link;
   define an extension function at an extension service;
   set the extension function link to a location of the extension function at the extension service;
   define an extended entity metadata based on the entity metadata and the extension metadata, wherein the extended entity metadata comprises a first link to the entity metadata and a second link to the extension metadata; and
   create an extended entity instance from the extended entity metadata.

11. The cloud platform of claim 10, wherein the at least one processor is further configured to:
   define a schema; and
   set the schema link to a location of the schema.

12. The cloud platform of claim 10, wherein the extended entity instance comprises an entity instance based on the entity metadata, and wherein data of the entity instance is stored in an entity service.

13. The cloud platform of claim 10, wherein the extended entity instance comprises an extension instance based on the extension metadata, and wherein data of the extension instance is stored in an extension service.

14. The cloud platform of claim 10, wherein the at least one processor is further configured to:
   receive a request defining the extended entity instance using at least one of JavaScript Object Notation (JSON) or eXtensible Markup Language (XML); and
   create the extended entity instance based on the request.

15. The cloud platform of claim 10, wherein the at least one processor is further configured to:
   detect a request associated with creating the extended entity instance failed; and
   store the request in an inconsistency model.

16. A non-transitory computer-readable device having instructions stored thereon that, when executed by at least one computing device, causes the at least one computing device to perform operations comprising:
   selecting an entity metadata in a cloud platform;
   defining an extension metadata for the entity metadata, wherein the extension metadata comprises a schema link and an extension function link;
   defining an extension function at an extension service;
   setting the extension function link to a location of the extension function at the extension service;
   defining an extended entity metadata based on the entity metadata and the extension metadata, wherein the extended entity metadata comprises a first link to the entity metadata in the cloud platform and a second link to the extension metadata in the cloud platform; and
   creating an extended entity instance in the cloud platform from the extended entity metadata.

17. The non-transitory computer-readable device of claim 16, the operations further comprising:
   defining a schema in the cloud platform; and
   setting the schema link to a location of the schema in the cloud platform.

18. The non-transitory computer-readable device of claim 16, wherein the extended entity instance comprises an entity instance based on the entity metadata, wherein data of the entity instance is stored in an entity service.

19. The non-transitory computer-readable device of claim 16, wherein the extended entity instance comprises an extension instance based on the extension metadata, wherein data of the extension instance is stored in an extension service.

20. The non-transitory computer-readable device of claim 16, the operations further comprising:
   detecting a request associated with creating the extended entity instance failed; and
   storing the request in an inconsistency model.

* * * * *